(12) United States Patent
Algrain

(10) Patent No.: US 8,975,767 B2
(45) Date of Patent: Mar. 10, 2015

(54) CONTROL SYSTEM FOR LOAD SHARING BETWEEN A GENERATOR SET AND AN INVERTER-BASED ENERGY STORAGE

(71) Applicant: Caterpillar Inc., Peoria, IL (US)

(72) Inventor: Marcelo C. Algrain, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 13/711,870

(22) Filed: Dec. 12, 2012

(65) Prior Publication Data

US 2014/0159365 A1    Jun. 12, 2014

(51) Int. Cl.
*H02P 11/00* (2006.01)
*H02J 3/32* (2006.01)

(52) U.S. Cl.
CPC .................................. *H02J 3/32* (2013.01)
USPC .............................................................. 290/7

(58) Field of Classification Search
None
See application file for complete search history.

(56) References Cited

U.S. PATENT DOCUMENTS

| | | | |
|---|---|---|---|
| 5,929,538 A * | 7/1999 | O'Sullivan et al. | 307/66 |
| 6,118,187 A * | 9/2000 | Hepner et al. | 290/40 B |
| 7,554,278 B2 | 6/2009 | Wegner-Donnelly et al. | |
| 7,839,027 B2 | 11/2010 | Shelton et al. | |
| 8,022,572 B2 | 9/2011 | Vyas et al. | |
| 8,138,720 B2 | 3/2012 | Snyder et al. | |
| 2010/0090532 A1* | 4/2010 | Shelton et al. | 307/46 |
| 2012/0068540 A1 | 3/2012 | Luo et al. | |

* cited by examiner

*Primary Examiner* — Pedro J Cuevas
*Assistant Examiner* — Sean Gugger
(74) *Attorney, Agent, or Firm* — BakerHostetler

(57) ABSTRACT

A power system includes a prime mover configured to generate a drive force, a generator configured to receive the drive force and be driven by the prime mover to produce electrical power for an external load. The system includes a power storage device configured to store electrical power or to discharge electrical power to the external load. The system further includes a controller configured to control the power storage device to discharge power to supplement the electrical power from the generator directed to the external load.

20 Claims, 3 Drawing Sheets

CONTROL SYSTEM FOR LOAD SHARING BETWEEN A GENERATOR SET AND AN INVERTER-BASED ENERGY STORAGE

FIELD

The disclosure relates to a control system for load sharing between a generator set and an inverter-based energy storage. More particularly, the disclosure relates to a control system for load sharing between a generator set and an inverter-based energy storage to limit frequency changes.

BACKGROUND

A generator set typically includes a generator and a prime mover, for example a combustion engine. In a typical generator set, a mixture of fuel and air is burned within the combustion engine and a mechanical rotation is generated that drives the generator to produce electrical power. Ideally, the engine drives the generator and accordingly produces electrical power having relatively constant characteristics (frequency, voltage, etc.).

Generator sets are often used as a source of power, for example, to supply electric machinery, such as an electric shovel, with power. Likewise generator sets may supply a hospital, a manufacturing facility, a military facility, or the like with power. Although effective, the generator set cannot respond immediately to sudden changes in power demand. For example, when an electric shovel starts to operate a motor that is carrying a heavy load, the power demand can quickly increase. As such, without intervention, a change in power demand can result in an abrupt and undesirable frequency change in the output power. On the other hand, if the generator set is implemented with a large prime mover and generator, changes in power demands are not as critical and changes in the frequency are minimal. However, cost, size, and/or weight of the larger generator set increase dramatically and efficiency decreases dramatically.

One attempt to minimize fluctuations in characteristics of the electrical power output provided by a power generation system is described in U.S. Pat. No. 7,839,027 ('027 patent). The '027 patent discloses systems, apparatus, and methods for maintaining the state of charge of energy storage devices such as batteries, flywheels, capacitors, or other technologies that are energetically coupled with the electricity grid to support ancillary services. To reliably respond to requests to regulate the grid, the charge on the energy storage device is sustained or restored to a specified range in a manner that optimizes the readiness of the energy storage device to supply ancillary services in light of the condition of the grid. A state of charge (SOC) of the energy storage device and the grid frequency may be monitored. When a request from the operator to regulate the grid frequency is not being serviced, the charge of the energy storage device may be increased or decreased so that the charge may be sustained within the specific range. Once the SOC falls outside of the first range, charge may be added to or removed from the energy storage device when the grid frequency has appropriate values, e.g. if the grid frequency is respectively above a first setpoint or below a second setpoint.

The '027 patent however does not utilize a discharge process to ensure the frequency error is quickly reduced. Moreover, the '027 patent is directed to power grids and not to generator sets operating in conjunction with smaller systems having greater demand fluctuations.

Accordingly, there is needed a less costly generator set and process that can minimize power fluctuations and prevent frequency variations when a load is applied.

SUMMARY

The foregoing needs are met, to a great extent, by the disclosure, wherein in one aspect a technique and apparatus are provided for a less costly and more efficient generator set that can minimize power fluctuations and limit abrupt frequency changes when a load is applied utilizing a smaller generator set.

In accordance with one aspect of the disclosure, a power system includes a prime mover configured to generate a drive force, a generator configured to receive the drive force and be driven by the prime mover to produce electrical power for an external load, a power storage device configured to store electrical power or to discharge electrical power to the external load, a controller configured to control the power storage device to discharge power to supplement the electrical power from the generator directed to the external load when the frequency of the electrical power is below a first frequency, and the controller further configured to subsequently control the power storage device to discharge power to supplement the electrical power from the generator directed to the external load at a constant rate after the frequency of the electrical power exceeds the first frequency until the frequency reaches a second frequency.

In accordance with another aspect of the disclosure, a power system includes means for producing a drive force, means for generating electrical power in response to receiving the drive force from the means for producing a drive force to produce electrical power for an external load, means for storing electrical power to store electrical power or to discharge electrical power to the external load, means for controlling to control the means for storing to discharge power to supplement the electrical power from the means for generating to the external load when the frequency of the electrical power is below a first frequency, and the means for controlling subsequently controlling the means for storing to discharge power to supplement the electrical power from the means for generating directed to the external load at a constant rate after the frequency of the electrical power exceeds the first frequency until the frequency reaches a second frequency.

In accordance with another aspect of the disclosure a process of operating a power system includes producing a drive force, generating electrical power in response to receiving the drive force to provide electrical power for an external load, storing electrical power to subsequently discharge power to the external load, controlling a discharge of power to supplement the electrical power from the step of generating electrical power for the external load when the frequency of the electrical power is below a first frequency, and subsequently controlling the discharge of power to supplement the electrical power to the external load at a constant rate after the frequency of the electrical power exceeds the first frequency until the frequency reaches a second frequency.

DETAILED DESCRIPTION

Figure 1:
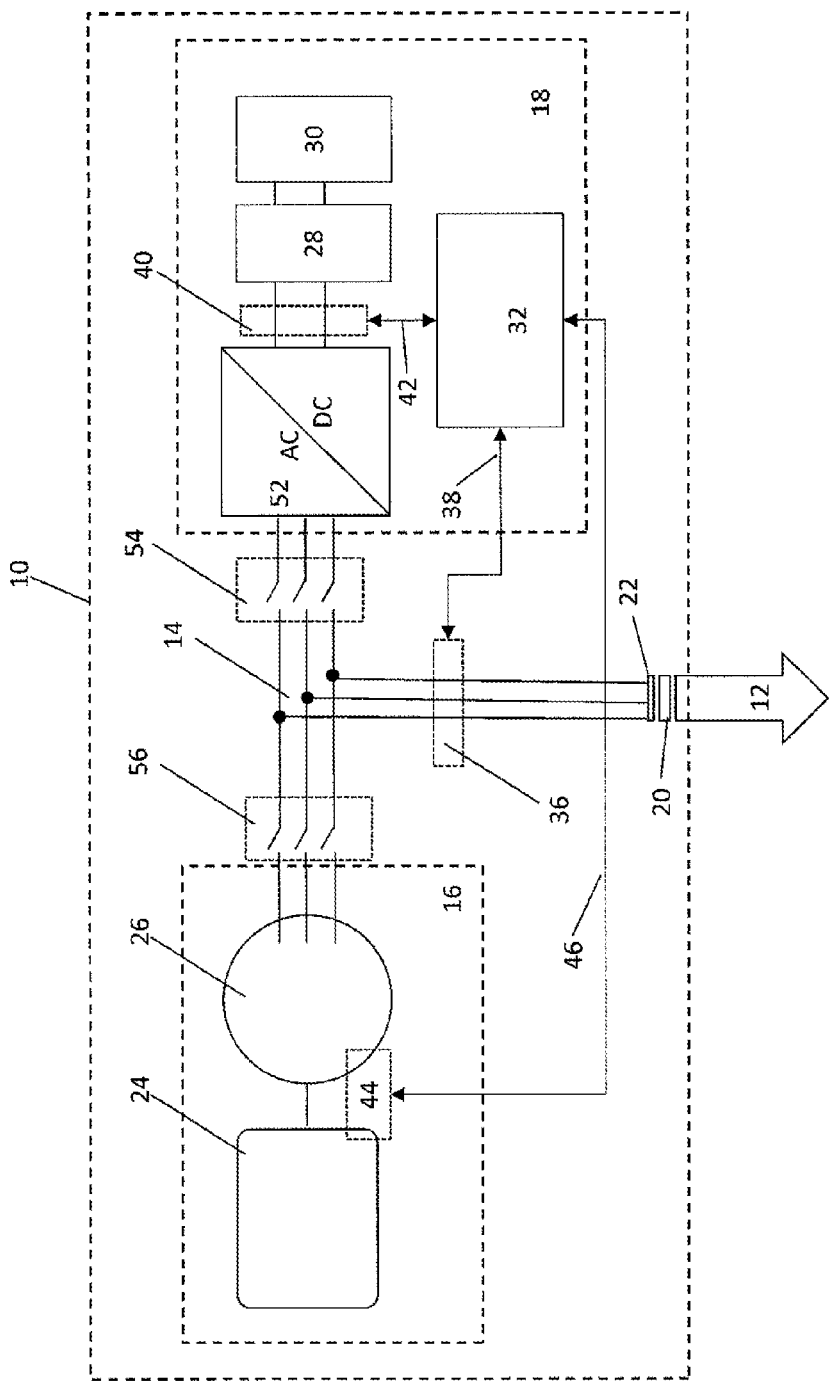
FIG. 1 shows a power system according to an aspect of the disclosure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

The disclosure will now be described with reference to the drawing figures, in which like reference numerals refer to like parts throughout. Aspects of the disclosure provide a generator set that can minimize power fluctuations and limit abrupt frequency changes when a load is applied utilizing a smaller generator set. Aspects of the disclosure further provide the ability to switch an energy storage source for frequency stabilization, i.e., after the system requests an increase in output power, an engine (or a downsized engine) may gradually ramp up a speed to a requested level while the energy storage is temporarily switched in to boost the power, limit frequency changes and support continual operation. Additionally, aspects of the disclosure implement the controller as a hysteresis like controller. Aspects of the disclosure further provide that the controller operate based on electrical frequency to avoid interference with a voltage regulator associated with the generator. Accordingly, this may allow the use of a smaller (more efficient and lower cost) generator set.

FIG. 1 shows a power system according to an aspect of the disclosure. More specifically, FIG. 1 illustrates an exemplary power system 10. The power system 10 may be configured to provide power to an external load 12. In one exemplary aspect, the power system 10 may be configured as a primary source of power, if desired. It is contemplated, however, that in some aspects, the power system 10 may be one of a plurality of power systems operating to provide power to the external load 12. It is further contemplated that in some aspects, the power system 10 may provide an immediate supply of reserve power provided to the external load 12 when power supplied from a utility power grid is interrupted.

As shown in FIG. 1, the power system 10 may include a generator set 16 and a transient management system 18. The generator set 16 and the transient management system 18 may be connected to the external load 12 by way of a power transmission network 20 and a connection 22. The connection 22 may, in part, include lines/connections 14 arranged between the generator set 16, the transient management system 18, and the connection 22.

The power system 10 may be a self-supporting, electricity generation and/or distribution system such as, for example, a machine (e.g., construction equipment, mining equipment, and/or agricultural equipment such as an electric shovel), motorized vehicle (e.g., a bus or a truck), a power supply for a remote facility, a power supply for a military facility, or the like. One skilled in the art will appreciate that the power system 10 may produce electrical power in multiple phases and/or different frequencies based upon requirements of the external load 12. The power system 10 may produce and/or supply electrical power in the form of alternating electric current such as, for example, three-phase alternating current with a preset frequency (e.g., 50 Hz, 60 Hz, or any other suitable frequency).

The external load 12 may include any type of power consuming system or device configured to receive electrical power and to utilize the electrical power to perform some type of task. The external load 12 may include, for example, electric powered construction or mining equipment, electric machines, lights, motors, heating elements, electronic circuitry, refrigeration devices, air conditioning units, computers, servers, etc. In a particular aspect, the external load 12 may be electric powered construction or mining machines such as an electric shovel.

The power transmission network 20 may embody any electrical transmission system for distributing electrical power generated by the power system 10 to the external load 12. For example, the power transmission network 20 may include a system that includes transmission lines, connection equipment (e.g., transformers, electrical switches, power relays, circuit breakers, and the like), and other suitable devices for distributing electrical power. However, the power transmission network 20 may be implemented with simpler or more complex configurations.

The connection 22 may include any type of electrical connector or system that is capable of coupling the generator set 16, the transient management system 18, and/or the external load 12. For example, the connection 22 may include various junction boxes, circuit interrupting devices, fuses, or any other components that may be suitable for electrically interconnecting one or more systems. The connection 22 may also or alternatively include a voltage transformer configured to reduce or otherwise condition the voltage or power provided by the generator set 16, and/or the transient management system 18 to a suitable level for use by conventional consumer devices. Additionally, the connection 22 may be a hardwired connection or a connector.

The generator set 16 may include any component or components that operate to generate electricity. In one aspect, the generator set 16 may include a prime mover 24 coupled to mechanically rotate a generator 26 that provides electrical power to the external load 12. For the purposes of this disclosure, the prime mover 24 is described as a heat engine, for example an internal or external combustion engine that combusts a mixture of fuel and air to produce mechanical rotation. One skilled in the art will recognize that the prime mover 24 may be any type of combustion engine such as, for example, a diesel engine, a gasoline engine, a gaseous fuel-powered engine, gas turbine, and the like. As such, the prime mover 24 may have a desired operating range and, when operating within this range, performance of the prime mover 24 may be substantially consistent and efficient, and the electrical output of the generator 26 may have characteristics (e.g., voltage, frequency, etc.) that are substantially consistent. In one example, the desired operating range may be associated with a rotational speed of the prime mover 24. When the speed of the prime mover 24 decreases below the desired operating range, the prime mover 24 may be considered to be lagging and the electrical output and frequency of the power of the generator 26 may degrade. Similarly, when the speed of prime mover 24 increases above the desired operating range, the prime mover 24 may be considered to be overspeeding and the electrical output of the generator 26 may again degrade.

The generator 26 may be, for example, an AC induction generator, a permanent-magnet generator, an AC synchronous generator, a switched-reluctance generator, or the like that is mechanically driven by the prime mover 24 to produce electrical power. In one aspect, the generator 26 may include multiple pairings of poles (not shown), each pairing having three phases arranged on a circumference of a stator (not shown) to produce an alternating current.

The transient management system 18 may include a plurality of components and subsystems for generating and maintaining a source of power for the power system 10. Specifically, the transient management system 18 may include a power control 28 and an energy storage device 30.

The energy storage device 30 may include any device that can store energy in potential forms, such as one or more capacitors. More specifically the energy storage device 30 may be one or more ultra capacitors, such as electric double-layer capacitors (EDLC), which are also known as super capacitors, super condensers, electrochemical double layer capacitors, or ultra capacitors. The ultra capacitors may be electrochemical capacitors or the like with relatively high energy density. The power supplied to the transient management system 18 may be used by the power control 28 to charge and/or maintain a charge within the energy storage device 30. Also, the energy storage device 30 may be implemented as a flywheel, an inductor, a battery, a fluid accumulator, and/or the like.

The transient management system 18 may include a bidirectional AC/DC converter 52. The bidirectional AC/DC converter 52 may receive an alternating current from the generator 26. The alternating current received by the bidirectional AC/DC converter 52 may be converted to direct current. This direct current may be applied to the power control 28 and the energy storage device 30. On the other hand, direct current may be output from the power control 28 and the energy storage device 30 and then may be input to the bidirectional AC/DC converter 52. The bidirectional AC/DC converter 52 may take the direct current and convert the direct-current to an alternating current to be provided to the connection 22 and the power transmission network 20 to provide power to the external load 12.

During normal operation, the transient management system 18 may receive power from the generator set 16. At any point in time, the transient management system 18 may selectively absorb excess power by charging the energy storage device 30, or supplement the power directed to the external load 12 by discharging the energy storage device 30 via the power control 28.

In one example, the transient management system 18 may function to only help maintain consistent electrical output of the generator set 16 under varying loads, when generator set 16 is fully operational. In this disclosure, the transient management system 18 may smooth operation of the generator set 16 under transient loading to limit abrupt frequency changes. Such an implementation allows for a smaller generator set 16 reducing costs, size, weight, and the like and increasing efficiency.

The power control 28 may embody an electronic device that is configured to convert, condition, control, and/or regulate the production, absorption, and discharge of electrical power within the transient management system 18 (i.e., the flow of power to and from energy storage device 30). In one aspect, the power control 28 may be configured to regulate the flow of electrical power by receiving an input of direct-current from the bidirectional AC/DC converter 52 (converted from the fixed or variable-frequency, alternating current (AC) from the generator set 16) and providing an augmented output as supplied by the energy storage device 30 to the bidirectional AC/DC converter 52 to provide AC power to the external load 12.

In some aspects, the power control 28 may take as basic a form as a switch, relay, or connection. In this regard, the power control 28 may be implemented as one or more switches or relays. For example, the power control 28 may include a switch or relay 56 arranged between the generator set 16 and the lines/connections 14. Alternatively or additionally, the power control 28 may include a switch or relay 54 arranged between the transient management system 18 and the lines/connections 14.

When the generator set 16 is providing power to the external load 12, the power control 28 may cause the energy storage device 30 to selectively absorb or supplement the power provided by the generator set 16 to the external load 12 such that fluctuating load demands of the external load 12 can be satisfied in an efficient and desired manner (i.e., allows time for the engine speed of generator set 16 to deviate from the current operating range). Accordingly, the transient management system 18 may be provided with a controller 32 to help regulate operation.

The controller 32 may embody single or multiple microprocessors, field programmable gate arrays (FPGAs), digital signal processors (DSPs), etc. that include a means for controlling an operation of the transient management system 18 in response to various input. Numerous commercially available microprocessors can be configured to perform the functions of the controller 32. It should be appreciated that the controller 32 could readily embody a microprocessor separate from that controlling other power system functions, or the controller 32 could be integral with a general power system microprocessor and be capable of controlling numerous power system functions and modes of operation. If separate from the general power system microprocessor, the controller 32 may communicate with the general power system microprocessor via datalinks or other methods. Various other known circuits may be associated with the controller 32, including power supply circuitry, signal-conditioning circuitry, actuator driver circuitry (i.e., circuitry powering solenoids, motors, or piezo actuators), communication circuitry, other appropriate circuitry and the like.

The controller 32 may be implemented as a hysteresis like controller. According to one aspect, the controller 32 may be configured to monitor performance of the power system 10 and responsively regulate operation of the transient management system 18. For example, the controller 32 may monitor a voltage, a current, and/or a frequency characteristic of the electrical power provided to the external load 12 with one or more sensors such as sensor 36. The output of the one or more sensors such as sensor 36 may be communicated along a line 38 or wirelessly to the controller 32. The controller 32 may monitor a voltage, a current, and/or a frequency characteristic of the electrical power provided by the transient management system 18 with one or more sensors such as sensor 40. The output of the one or more sensors such as sensor 40 may be communicated along a line 42 or wirelessly to the controller 32. In response to a deviation of the supplied power from a desired power level (during transient operation), the controller 32 may selectively activate, deactivate, or adjust activation of the transient management system 18 to supplement or absorb the power being directed to the external load 12. Additionally or alternatively, the controller 32 may monitor operation of the generator set 16 with one or more sensors that may include a sensor 44 providing a signal to the controller 32 along a communication line 46 or wirelessly, and in response to an operational deviation from the desired operating range, the controller 32 may activate, deactivate, or adjust activation of the transient management system 18 and/or generator set 16. In this manner, the actual demands of the external load 12 may be satisfied while the generator set 16 is adjusted to the desired operating range.

According to another aspect, the controller 32 may predictively regulate operation of the transient management system 18. Specifically, in response to a measured, calculated, or assumed power demand change of the external load 12, the controller 32 may selectively activate, deactivate, or adjust activation of the transient management system 18. Similarly, in response to an indication of a desired load change, the controller 32 may regulate operation of the transient management system 18 to accommodate the change before the change can be measured, calculated, or assumed. In this manner, predicted demand changes of the external load 12 may be satisfied before they are actually experienced by the generator set 16.

The controller 32 may regulate operation of the transient management system 18 to absorb or supplement power provided to the external load 12 during the transient mode of operation by selectively causing the energy storage device 30 to be charged or discharged. For example, during the transient mode of operation, the controller 32 may cause the energy storage device 30 to absorb or supplement the power provided to the external load 12. For example, during the generator set 16 operation and in response to an actual or predicted sudden increase in load demand, the controller 32 may cause the power control 28 to discharge power from the energy storage device 30 to the external load 12 to account for the increase in demand such that operation of the generator set 16 remains within the desired operating range and the load demand increase is satisfied. Similarly, in response to an actual or predicted sudden decrease in load demand during the generator set 16 operation, the controller 32 may cause the power control 28 to direct excess power from the generator set 16 to charge the energy storage device 30 and account for the decrease such that operation of the generator set 16 is given time to adjust to a new desired operating range.

During a charging event, when excess power produced by the generator set 16 is being absorbed by the transient management system 18 in response to a sudden decrease in load demand of the generator set 16, the energy storage device 30 may be allowed to charge to a maximum limit. During a discharging event when the transient management system 18 is supplementing the power directed to the external load 12 to satisfy a sudden increase in load demand, the energy storage device 30 may be allowed to discharge as needed.

Figure 2:
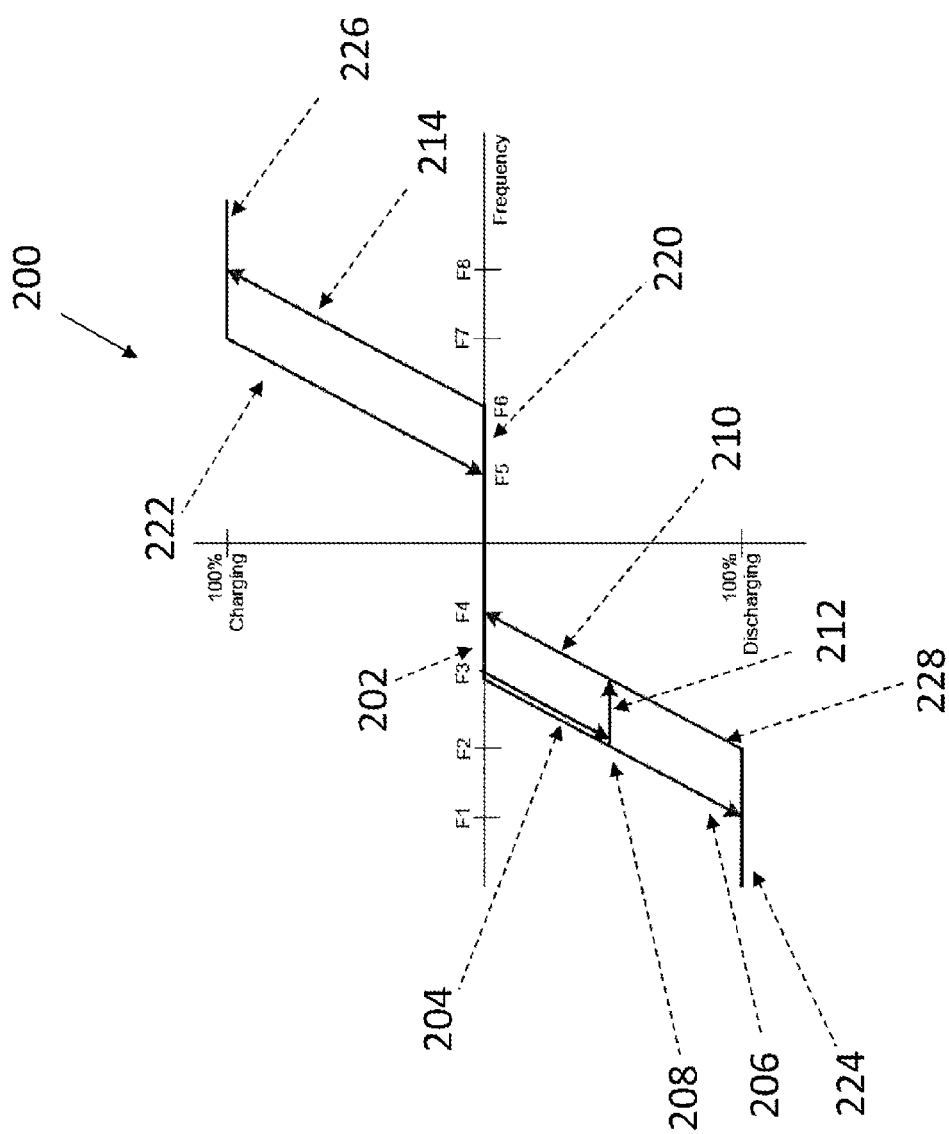
FIG. 2 illustrates a plot of power frequency versus charging/discharging of the energy storage device according to an aspect of the disclosure.

FIG. 2 illustrates a plot of power frequency versus charging/discharging of the energy storage device according to an aspect of the disclosure. In particular, the x-axis is the frequency of the power provided to the external load 12; and the y-axis is the percent of charging and discharging by the energy storage device 30. More specifically, the origin is indicative of the desired target frequency. The frequency error is defined as the difference between the target frequency and the actual frequency.

If during operation of the power system 10, a greater demand for power from the external load 12 is required, the frequency of the delivered power may begin to decrease (from the origin toward F4 and F3) if the generator set 16 is not able to meet the demand. In this regard, the frequency may decrease to a predetermined frequency F3 as shown by dashed arrow 202. In this case, the energy storage device 30 and/or the transient management system 18 may not charge or discharge the energy storage device 30 as a function of the frequency error as the change in frequency is within allowable margin.

If the frequency should continue to decrease past a predetermined frequency F3 due to the demand of the external load 12, the transient management system 18 may control the energy storage device 30 to start to discharge the energy storage device 30. In one aspect, the energy storage device 30 may be discharged at a rate proportional to the frequency error. This is shown in FIG. 2 by the arrow indicated by dashed arrow 204. Other rates of discharge are contemplated as well.

The energy storage device 30 may continue to increase the percentage of discharge until reaching 100% as shown by the arrow indicated by dashed arrow 206. When the power has reached a predetermined frequency F1 or less, the discharge rate may be 100% as shown by dashed arrow 224. When the power system 10 eventually increases power and accordingly increases the frequency thereof to frequency F2, the rate of discharge will decrease as shown by arrow indicated by dashed arrow 228.

On the other hand, should the frequency start to increase at a point shown by dashed arrow 208, the energy storage device 30 may be controlled to maintain the current discharge rate to be constant as shown by the horizontal arrow indicated by dashed arrow 212. This may ensure that the frequency of the power provided to the external load 12 may be increased to the target frequency more quickly. Thereafter, if it is determined that the frequency of the power has increased to a predetermined frequency between frequency F2 and frequency F4 based on a function of the discharge rate percentage, the controller 32 may reduce the current discharge rate of the energy storage device at a rate proportional to the error frequency as shown by dashed arrow 210.

Should the power system 10 be operating with a surplus of power, the frequency of the power delivered to the external load 12 may increase. While the frequency of the power is below a predetermined frequency F6, as shown by dashed arrow 220, the power system 10 may not charge or discharge the energy storage device 30 as a function of the frequency error. When the frequency of the power provided by the power system 10 exceeds a predetermined frequency F6, the power system 10 may start to charge the energy storage device 30 as shown by dashed arrow 214. The rate of charging of the energy storage device 30 may be proportional to the error of the frequency of the power with respect to the target frequency. Other rates of charging are contemplated by the disclosure. When the frequency of the power provided by the power system 10 exceeds the predetermined frequency F8, the power system 10 may charge the energy storage device 30 at 100% as shown by dashed arrow 226.

Once the frequency of the power system 10 returns to the predetermined frequency F7, the rate of charging of the energy storage device 30 may decrease at a rate proportional to the error of the frequency of the power with respect to the target frequency as shown by dashed arrow 222. After the frequency of the power delivered to the external load 12 reaches a predetermined frequency F5, the power system 10 may no longer charge the energy storage device 30 as a function of frequency error.

In addition to charging or discharging the energy storage device 30 as a function of frequency error during transient conditions, the controller 32 may charge or discharge the energy storage device 30 to maintain a desired state of charge during non-transient conditions when the power system frequency is within its normal range between frequency F3 and F6.

Figure 3:
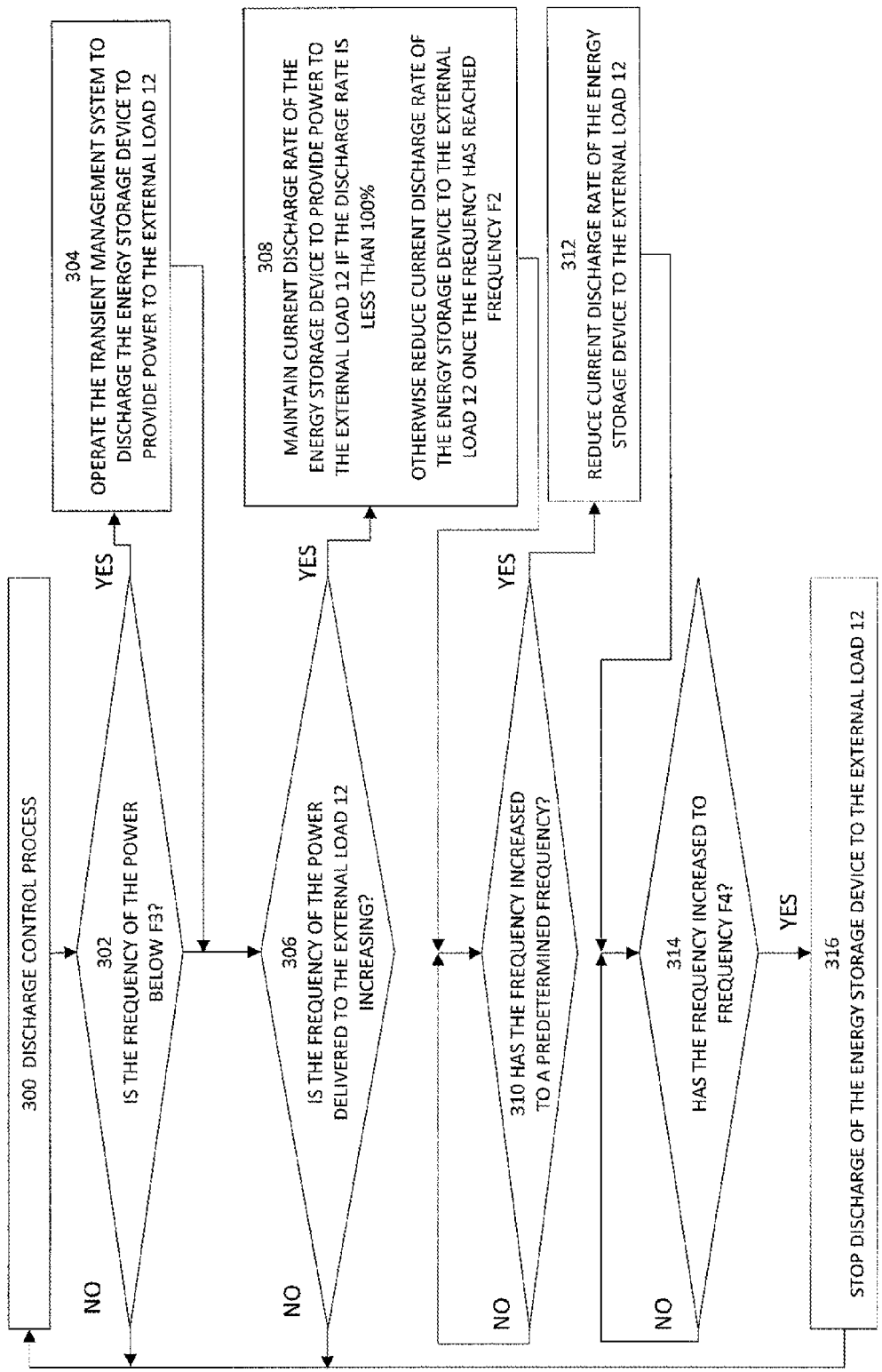
FIG. 3 shows a flowchart illustrating a process for operating the power system during a discharge process according to an aspect of the disclosure.

FIG. 3 shows a flowchart illustrating a process for operating the power system according to an aspect of the disclosure. During operation of the power system 10, the controller 32 may monitor characteristics associated with the power supplied to the external load 12 and/or associated with demand changes of the external load 12 (step 302). For example, the controller 32 may use current sensors, voltage sensors, frequency sensors, engine speed sensors (i.e., utilizing one or more of sensor 36, sensor 40, sensor 44 described above), internal calculations or assumptions, operator input, and the like to passively and/or actively monitor supply voltage, supply current, supply frequency, generator set performance (e.g., prime mover performance), and/or external load demand changes. In a particular aspect, the controller 32 may utilize one or more of the sensor 36, sensor 40, and sensor 44 to monitor an aspect associated with power system 10 associated with the frequency of the power produced by the generator set 16. The controller 32 may then use one or more of these monitored characteristics to determine whether there has been or will be a change (i.e., an increase or a decrease) in power demand or power supply. The controller 32 may use the characteristics to determine if during operation of the generator set 16, a demand for power from the external load 12 may affect or is affecting frequency of the power. In any of these situations, there may be a risk of power being supplied to the external load 12 with undesired characteristics (voltage, frequency, etc.) or of suboptimal prime mover operation (e.g., lagging or overspeeding). In particular, the power supplied to the external load 12 may have a lower than desired frequency.

In particular, as shown in 302 the controller 32 may monitor the frequency of the generator set 16 with sensor 44 and/or the frequency of the power delivered to the external load 12 using sensor 36. If the power system 10 is able to provide the external load 12 with sufficient electrical power such that the frequency does not fall below a predetermined frequency F3 (step 302: No), the controller 32 may continue to loop and monitor the frequency as shown in step 302.

Returning again to step 302, if the demand for power from external load 12 increases, the frequency of the power may fall below a predetermined frequency F3 (step 302: yes), the transient management system 18 may be activated as described above to supplement the electrical power directed to the external load 12 (step 304). In a particular aspect, the transient management system 18 may discharge the energy storage device 30 at a rate proportional to the frequency error. Other discharge rates are contemplated as well. Thereafter, operation of the generator set 16 may optionally be adjusted to increase the supply of power to address the sudden increase in demand and generate additional power in order to increase the frequency of the power.

Next, in step 306 if the frequency of the power delivered to the external load increases (step 306: yes), the controller 32 may continue to discharge the energy storage device 30 at the current discharge rate to provide power to the external load 12 as long as the discharge rate is less than 100%. The current discharge rate may be the rate that is proportional to the frequency error at the time the frequency of the power started to increase. In this regard, maintaining the current discharge rate ensures that the frequency of the power delivered to the external load 12 returns more quickly to the desired target frequency.

On the other hand, in step 308 if the discharge rate is at 100%, then the rate of discharge of the energy storage device 30 may be reduced once the frequency has reached a predetermined frequency. In particular, the energy storage device 30 rate of discharge may be reduced at a rate proportional to the error of the current frequency to the target frequency once it reaches a predetermined frequency between frequency F2 and frequency F4 based on a function of the discharge rate percentage. Other rates of discharge are contemplated as well.

Thereafter, in step 310 if it is determined that the frequency of the power has increased to a predetermined frequency between frequency F2 and frequency F4 based on a function of the discharge rate percentage (step 312: yes), the controller 32 may reduce the current discharge rate of the energy storage device at a rate proportional to the error frequency. This may change the rate of discharge of the energy storage device 30 only in the case where the discharge rate was less than 100%. The rate of discharge of the energy storage device 30 having been held constant in step 308.

On the other hand, in step 306 if the frequency of the power delivered to the external load is not increasing (step 306: no), the discharge control process 300 may continue to loop through step 302 and step 304 to operate the transient system to discharge the energy storage device at the previous rate which may be a rate proportional to the frequency error or a constant rate as set by step 308.

Next, in step 314 if the frequency has increased to a predetermined frequency F4 (step 314: yes), the controller 32 may stop discharge of the energy storage device 30 to the external load 12 as shown in step 316. Thereafter the discharge control process 300 may return to step 302 to again monitor the frequency of the power delivered to the external load 12.

INDUSTRIAL APPLICABILITY

The power system 10 may have wide applications. Specifically, because controller 32 may trigger activation or deactivation of the transient management system 18 based on power supply changes, load demand changes, and/or generator set performance (i.e., actual or predicted prime mover speed deviations), to ensure that the power system 10 may be able to provide substantially consistent power supply having desired frequency characteristics. Moreover, the power system 10 may have the ability to utilize the energy storage device 30 to ensure a quicker return to the target frequency.

The disclosed power system may provide consistent power to an external load in an efficient manner. The disclosed system may be used during a transient period to accommodate sudden load changes that might otherwise cause inefficient or undesired operation of the power source.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A power system, comprising:
   a prime mover configured to generate a drive force;

a generator configured to receive the drive force and be driven by the prime mover to produce electrical power for an external load;
a power storage device configured to store electrical power or to discharge electrical power to the external load;
a controller configured to control the power storage device to discharge power to supplement the electrical power from the generator directed to the external load when the frequency of the electrical power is below a first frequency; and
the controller further configured to subsequently control the power storage device to discharge power to supplement the electrical power from the generator directed to the external load at a constant rate after the frequency of the electrical power exceeds the first frequency until the frequency reaches a second frequency.

2. The power system of claim 1, wherein the controller is further configured to control the power storage device to discharge power to supplement the electrical power from the generator directed to the external load with a discharge rate proportional to an error between a current frequency and a desired frequency.

3. The power system of claim 1, wherein the controller is further configured to control the power storage device to be charged from at least part of the electrical power from the generator.

4. The power system of claim 1, further comprising a bidirectional AC/DC converter configured to convert AC power from the generator to DC power for the power storage device.

5. The power system of claim 1, further comprising a bidirectional AC/DC converter configured to convert DC power from the power storage device to AC power for the external load.

6. The power system of claim 1, further comprising a sensor configured to sense a physical property of at least one of the prime mover, the generator, and the power storage device, wherein the physical property is indicative of the frequency of the electrical power produced for the external load.

7. The power system of claim 1, wherein the power storage device includes at least one of an ultra capacitor, a lithium ion battery, and a high-power lead acid battery.

8. A power system, comprising:
means for producing a drive force;
means for generating electrical power in response to receiving the drive force from the means for producing a drive force to produce electrical power for an external load;
means for storing electrical power to store electrical power or to discharge electrical power to the external load;
means for controlling to control the means for storing to discharge power to supplement the electrical power from the means for generating to the external load when the frequency of the electrical power is below a first frequency; and
the means for controlling subsequently controlling the means for storing to discharge power to supplement the electrical power from the means for generating directed to the external load at a constant rate after the frequency of the electrical power exceeds the first frequency until the frequency reaches a second frequency.

9. The power system of claim 8, wherein the means for controlling controls the means for storing to discharge power to supplement the electrical power from the means for generating directed to the external load with a discharge rate proportional to an error between a current frequency and a desired frequency.

10. The power system of claim 8, wherein the means for controlling controls the means for storing to be charged from at least part of the electrical power from the means for generating.

11. The power system of claim 8, further comprising means for bidirectional AC/DC converting configured to convert AC power from the means for generating to DC power for the means for storing.

12. The power system of claim 8, further comprising means for bidirectional AC/DC converting to convert DC power from the means for storing to AC power for the external load.

13. The power system of claim 8, further comprising sensing means to sense a physical property of at least one of the means for producing a drive force, the means for generating electrical power, and the means for storing, wherein the physical property is indicative of the frequency of the electrical power produced for the external load.

14. The power system of claim 8, wherein the means for storing includes at least one of an ultra capacitor, a lithium ion battery, and a high-power lead acid battery.

15. A process of operating a power system, comprising:
producing a drive force;
generating electrical power in response to receiving the drive force to provide electrical power for an external load;
storing electrical power to subsequently discharge power to the external load;
controlling a discharge of power to supplement the electrical power from the step of generating electrical power for the external load when the frequency of the electrical power is below a first frequency; and
subsequently controlling the discharge of power to supplement the electrical power to the external load at a constant rate after the frequency of the electrical power exceeds the first frequency until the frequency reaches a second frequency.

16. The process of claim 15, wherein controlling further includes discharging power to supplement the electrical power to the external load with a discharge rate proportional to an error between a current frequency and a desired frequency.

17. The process of claim 15, further comprising converting AC power from DC power prior to the step of storing.

18. The process of claim 15, wherein storing includes storing electrical power in at least one of an ultra capacitor, a lithium ion battery, and a high-power lead acid battery.

19. The process of claim 15, further comprising converting DC power to AC power associated with the controlling the discharge of power to supplement the electrical power to the external load.

20. The process of claim 15, further comprising sensing a physical property of at least one of the step of producing a drive force, step of generating electrical power, and the step of storing, wherein the physical property is indicative of the frequency of the electrical power produced for the external load.

\* \* \* \* \*